US 9,961,513 B2

(12) United States Patent
Trainin et al.

(10) Patent No.: US 9,961,513 B2
(45) Date of Patent: May 1, 2018

(54) DEVICE, SYSTEM AND METHOD OF WIRELESS COMMUNICATION

(71) Applicant: INTEL CORPORATION, Santa Clara, CA (US)

(72) Inventors: Solomon B. Trainin, Haifa (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 122 days.

(21) Appl. No.: 14/972,674

(22) Filed: Dec. 17, 2015

(65) Prior Publication Data

US 2016/0192357 A1    Jun. 30, 2016

Related U.S. Application Data

(63) Continuation of application No. 13/820,544, filed as application No. PCT/US2011/050545 on Sep. 6, 2011, now Pat. No. 9,246,742.
(Continued)

(51) Int. Cl.
*H04J 3/24* (2006.01)
*H04W 76/02* (2009.01)
(Continued)

(52) U.S. Cl.
CPC .......... *H04W 4/08* (2013.01); *H04L 29/0653* (2013.01); *H04L 61/6022* (2013.01); *H04L 69/22* (2013.01); *H04W 8/26* (2013.01); *H04W 12/04* (2013.01); *H04W 72/005* (2013.01); *H04W 72/0446* (2013.01); *H04W 76/025* (2013.01); *H04W 84/20* (2013.01)

(58) Field of Classification Search
CPC ................................................... H04L 61/6022

USPC .......................................... 370/254, 312, 349
See application file for complete search history.

(56) References Cited

U.S. PATENT DOCUMENTS 7,978,717 B2    7/2011  Banks et al.
8,750,242 B2    6/2014  Forte et al.
(Continued)

FOREIGN PATENT DOCUMENTS

CN          1914832      2/2007
CN        101064728     10/2007
(Continued)

OTHER PUBLICATIONS

Search Report for European Patent Application No. 11824019.1 dated Jun. 17, 2016, 7 pages.
(Continued)

*Primary Examiner* — Charles C Jiang
*Assistant Examiner* — Will Lin
(74) *Attorney, Agent, or Firm* — Shichrur & Co.

(57) ABSTRACT

Some demonstrative embodiments include devices, systems and/or methods of wireless communication. For example, a wireless communication unit may include a Multi Media-Access-Control (MAC) Address Station-Management-Entity (MM-SME) managing a plurality of MAC entities having a respective plurality of MAC addresses. The wireless communication unit may transmit a frame including a Multi-MAC-Addresses-Element (MMAE), which includes two or more MAC addresses of the plurality of MAC addresses and a control field defining at least one common communication attribute to be applied to the two or more MAC addresses.

28 Claims, 3 Drawing Sheets

Related U.S. Application Data

(60) Provisional application No. 61/380,379, filed on Sep. 7, 2010.

(51) Int. Cl.

| | | |
|---|---|---|
| *H04W 4/08* | (2009.01) | |
| *H04W 72/00* | (2009.01) | |
| *H04L 29/12* | (2006.01) | |
| *H04W 12/04* | (2009.01) | |
| *H04L 29/06* | (2006.01) | |
| *H04W 72/04* | (2009.01) | |
| *H04W 8/26* | (2009.01) | |
| *H04J 1/16* | (2006.01) | |
| *H04W 84/20* | (2009.01) | |

(56) References Cited

U.S. PATENT DOCUMENTS

| | | |
|---|---|---|
| 9,246,742 B2 | 1/2016 | Tranin et al. |
| 2006/0013256 A1 | 1/2006 | Lee et al. |
| 2006/0117174 A1 | 6/2006 | Lee |
| 2006/0268715 A1 | 11/2006 | Zuniga et al. |
| 2008/0155069 A1 | 6/2008 | Kunhappan et al. |
| 2008/0285520 A1 | 11/2008 | Forte et al. |
| 2009/0016306 A1 | 1/2009 | Wang et al. |
| 2011/0205962 A1 | 8/2011 | Das et al. |
| 2013/0163496 A1 | 6/2013 | Trainin et al. |

FOREIGN PATENT DOCUMENTS

| | | |
|---|---|---|
| KR | 20080085986 | 9/2008 |
| KR | 20080111297 | 12/2008 |

OTHER PUBLICATIONS

Liwen Chu et al, '802.11ad comment resolution, IEEE 802.11 Wireless LANs', IEEE 802.11/1007r2, Aug. 31, 2010, pp. 1-7.

Solomon Trainin et al, 'IEEE P802.11 Wireless LANs', IEEE 802.11-10/1200r1 Oct. 12, 2010, pp. 1-10.

Eldad Perahia et al, 'TGad Conference Call Minutes', IEEE P802. 11, Wireless LANs, IEEE 802.11-10/0013r11, Oct. 27, 2010, pp. 1-23.

Office Action for European Patent Application No. 16188168.5, dated Nov. 18, 2016, 4 pages.

European Search Report for European Patent Application No. 16188168.5 dated Mar. 23, 2017, 4 pages.

European Search Report for European Patent Application No. 16171178.3 dated Oct. 12, 2016, 8 pages.

Office Action for Chinese Patent Application No. 201180043095.X, dated Feb. 16, 2015, 26 pages, including 17 pages of English translation.

Wireless Gigabit Alliance (WGA) Specifications; WiGig MAC and PHY Specification Version 1.0, Apr. 2010—Final Specification; 311 pages.

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications. 1232 pages.

International Search Report and Written Opinion for PCT/US20111050545, dated Jan. 2, 2012, 8 pages.

International Preliminary Report on Patentability for PCT/US2011/050545, dated Mar. 21, 2013, 5 pages.

Office Action for Chinese Patent Application No. 201180043095.X, dated Nov. 3, 2015, 27 pages, including 18 pages of English translation.

Office Action for U.S. Appl. No. 13/820,544. dated May 12, 2015, 33 pages.

Office Action for U.S. Appl. No. 13/820,544 dated Dec. 2, 2014, 24 pages.

Notice of Allowance for U.S. Appl. No. 13/820,544, dated Sep. 2, 2015, 9 pages.

Office Action for European Patent Application No. 11824019.1 dated Aug. 14, 2017, 4 pages.

Office Action for European Patent Application No. 16171178.3, dated Sep. 8, 2017, 6 pages.

DEVICE, SYSTEM AND METHOD OF WIRELESS COMMUNICATION

CROSS REFERENCE

This application claims the benefit of and priority from U.S. Provisional Patent application No. 61/380,379, entitled "Method System and Apparatus for Communication At Wireless Link", filed Sep. 7, 2010, the entire disclosure of which is incorporated herein by reference.

BACKGROUND

A first wireless communication device and a second wireless communication device may establish a wireless communication link.

The first and/or second wireless communication devices may include, for example, a mmWave station (STA) ("DBand STA") having a radio transmitter operating on a channel that is within a directional band ("DBand"). The DBand may include any suitable frequency band, e.g., having a channel starting frequency above 50 GHz, in which a STA is allowed to operate.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
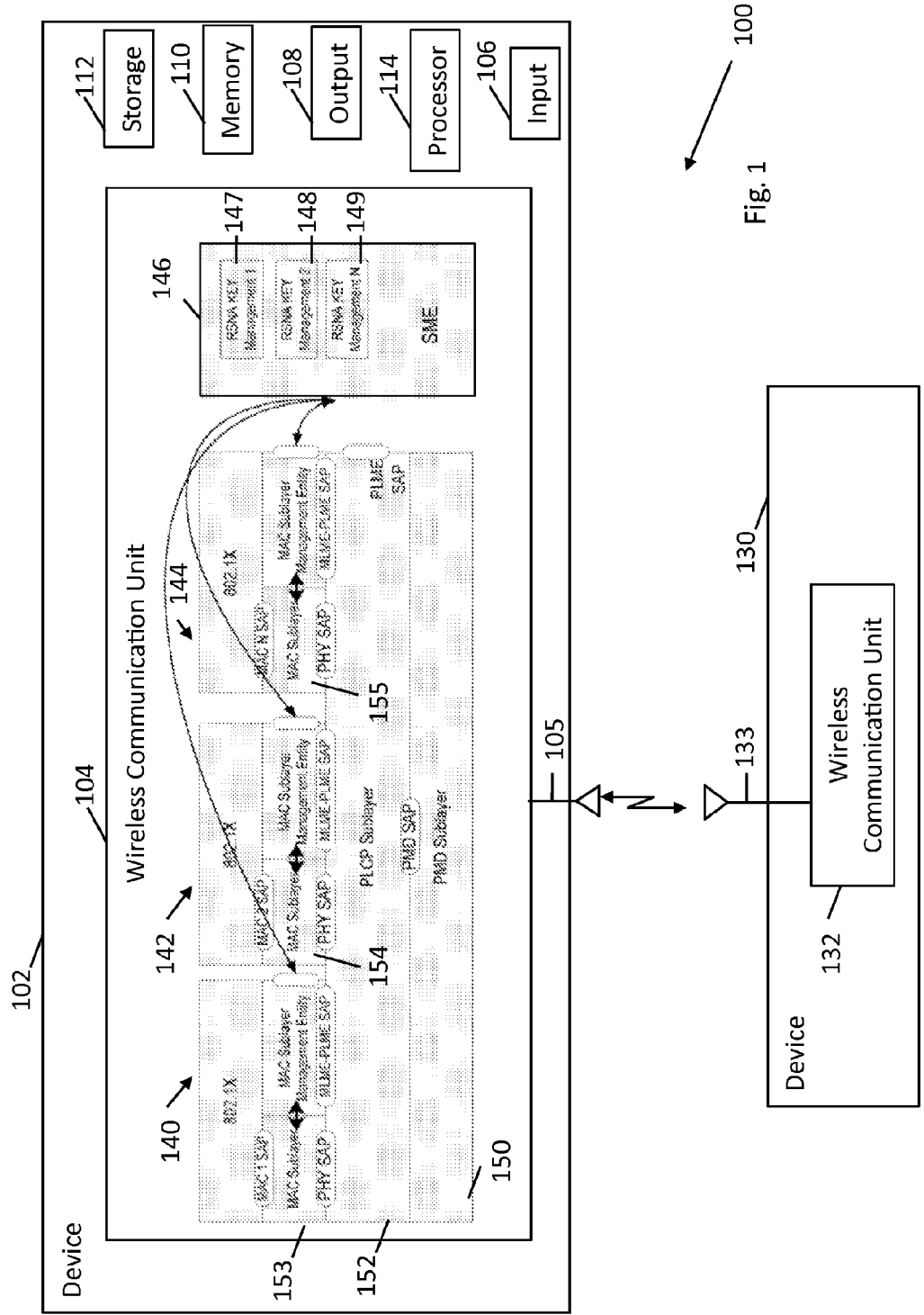
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"), IEEE 802.11 task group ad (TGad)) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include an antenna covered by a quasi-omni antenna pattern. For example, the antenna may include at least one of a phased array antenna, a single element antenna, a set of switched beam antennas, and the like.

The phrase "quasi-omni antenna pattern", as used herein, may include an operating mode with a widest practical beamwidth attainable for a particular antenna.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "association", as used herein may relate to a service used to establish access point/station (AP/STA) mapping and enable STA invocation of distribution system services (DSSs).

The term "authentication", as used herein may relate to a service used to establish the identity of one station (STA) as a member of the set of STAs authorized to associate with another STA.

The term "beamforming", as used herein, may relate to a spatial filtering mechanism, which may be used at a transmitter to improve the received signal power or signal-to-noise ratio (SNR) at an intended receiver.

The phrase "non-access-point (non-AP) station (STA)", as used herein, may relate to a STA that is not contained within an AP.

The phrase "service period" (SP), as used herein, may relate to a contiguous time during which one or more downlink individually addressed frames are transmitted to a quality of service (QoS) station (STA) and/or one or more transmission opportunities (TXOPs) are granted to the same STA.

The phrase "directional band" (DBand), as used herein, may relate to a frequency band wherein the Channel starting frequency is above 45 GHz.

The phrase "Ultra Band (UB)" may relate to the frequency band of 57-66 GHz.

The phrase "mmWave STA (STA)" may relate to a STA having a radio transmitter which is operating on a channel that is within the UB.

The phrase "multiple MAC addresses Station Management Entity (SME)" (MM-SME), as used herein, may relate to a component of station management that coordinates management of multiple cooperating STAs. A STA coordinated and/or managed by a MM-SME is also referred to as a "MM-SME coordinated STA". A MAC entity coordinated and/or managed by a MM-SME is also referred to as a "MM-SME coordinated MAC entity".

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "multiple MAC addresses link (MMAL)" may relate to a link between two STAs, wherein one of the STAs is coordinated by an MM-SME that delivered a MMAE to the other peer STA.

The phrase "multiple MAC addresses link cluster" may relate to all multiple MAC addresses links between a pair of STAs.

The phrase "peer to peer traffic specification" (PTP TSPEC) may relate to Quality of Service (QoS) characteristics of a data flow between non-AP QoS stations.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

Wireless communication devices 102 and/or 130 may also include, for example, one or more of a processor 114, an input unit 106, an output unit 108, a memory unit 110, and a storage unit 112, Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include an antenna covered by a quasi-omni antenna pattern. For example, antennas 105 and/or 133 may include at least one of a phased array antenna, a single element antenna, a set of switched beam antennas, and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and/or 130 may perform the functionality of mmWave stations ("DBand STA").

In some demonstrative embodiments, wireless communication unit 104 may include a Multi Media-Access-Control (MAC) Station-Management-Entity (MM-SME) 146 managing a plurality of stations (STAs) having a respective plurality of MAC addresses. For example, MM-SME 146 may manage three MAC entities of three respective STAs, e.g., MAC entities 140, 142 and/or 144, having three respective MAC addresses.

In some demonstrative embodiments, wireless communication unit 104 may include a common physical Layer (PHY) shared the plurality of MAC entities. For example, MAC entity 140 may include a MAC sub-layer 153 having a first MAC address, MAC entity 142 may include a MAC sub-layer 154 having a second MAC address, and MAC entity 144 may include a MAC sub-layer 155 having a third MAC address. MAC sub-layers 153, 154 and 155 may share, for example, a common PHY layer, e.g., including a common Physical Layer Convergence Protocol (PLCP) sub-layer 152 and a common Physical Medium Dependent (PMD) sub-layer 150.

In some demonstrative embodiments, SME 146 may include an MM-SME to coordinate with SMEs in other STAs and/or support multiple MAC addresses. The MM-SME may coordinate the management of multiple MAC entities having MAC sublayers, e.g., MAC sub-layers 153, 154 and 155. For example, each of MAC sub-layers 153, 154 and 155 may have a separate MAC Service Access Point (SAP) and a MAC sub-layer management entity (MLME) SAP. Each MAC entity may be identified by a separate MAC address.

In some demonstrative embodiments, MM-SME 146 may manage the plurality of STAs using a respective plurality of security keys. For example, MM-SME 146 may control the MAC SAPs of MAC entities 140, 142 and/or 144 using separate and/or independent Robust Security Network Association (RSNA) key management entities 147, 148 and 149, respectively.

In some demonstrative embodiments, MAC sub-layers 153, 154 and/or 155 may utilize a back-off mechanism for accessing the shared PHY layer, for example, in order to avoid collision of transmission attempts of MAC sub-layers 153, 154 and/or 155.

In some demonstrative embodiments, MM-SME 146 may be configured to control the power management mode, DBand antenna configuration and/or other parameters and/or states of MAC entities 140, 142 and/or 144, to eliminate unnecessary duplication of functions.

In some demonstrative embodiments, MM-SME 146 may signal to a peer STA a change in the power management mode of the STAs coordinated by MM-SME 146 via any one of MAC entities 140, 142 and 144, e.g., as described below.

In some demonstrative embodiments, a beamforming link established between STAs may be used by all MAC sub-layers 153, 154 and 155 coordinated by the same MM-SME 146, e.g., as described in detail below.

In some demonstrative embodiments, wireless communication unit 104 may transmit, e.g., to device 130, a frame including a Multi-MAC-Addresses-Element (MMAE), which includes two or more MAC addresses of the plurality of MAC addresses managed by MM-SME 146, and a control field defining at least one common communication attribute to be applied to the two or more MAC addresses, e.g., as described in detail below. In one example, wireless communication unit 104 may transmit a MMAE including the MAC addresses of MAC entities 140 and 144 and a control field defining at least one common communication attribute to be applied to MAC entities 140 and 144. In another example, wireless communication unit 104 may transmit a MMAE including the MAC addresses of MAC entities 140, 142 and 144 and a control field defining at least one common communication attribute to be applied to MAC entities 140, 142 and 144.

In some demonstrative embodiments, wireless communication unit 104 may transmit the MMAE as part of a management action frame, e.g., to device 130. For example, wireless communication unit 104 may transmit the MMAE as part of a probe request frame, a probe response frame, an association request frame, an association response frame, a Traffic Stream Establishment (TSE) frame, an announce frame, an information request frame, or an information response frame.

In some demonstrative embodiments, wireless communication unit 104 may transmit the MMAE as part of any frame that advertises MM-SME capabilities of SME 146, for example, as part of probe and/or information request and/or response frames, as part of one or more frames that establish communication agreements, for example, association, Add-Traffic-Specification (ADDTS) and/or Block-Acknowledgment (BA) requests and/or responses, and the like.

In some demonstrative embodiments, the control field of the MMAE may include a Single-Association-Identifier (AID) bit indicating whether a single AID is to be used for commonly identifying the two or more MAC addresses included in the MMAE, e.g., as described in detail below.

In some demonstrative embodiments, the control field of the MMAE may include a MMAE owner value identifying an owner MAC entity of the MMAE.

For example, the MMAE owner value may have a first value representing no owner, a second value representing a non-Access-Point (AP) or non-Personal-Basic-Service-Set-Control-Point (PCP), a third value representing a PCP, or a fourth value representing an AP, e.g., as described in detail below.

In some demonstrative embodiments, the control field of the MMAE may include a power-mode bit indicating a common power state scheme to be applied to two or more MAC entities having the two or more MAC addresses.

For example, the power-mode bit may have either a first value indicating that when a MAC entity of the two or more MAC entity moves from an awake state to a doze state all other MAC entities of the two or more MAC entities move to the doze state and that the MAC entity moves from the doze state to the awake state only when all the other MAC entities move to the awake state, or a second value indicating that when the MAC entity moves from the doze state to the awake state all the other MAC entities move to the awake state and that the MAC entity moves from the awake state to the doze state only when all the other MAC entities move to the doze state, e.g., as described in detail below.

In some demonstrative embodiments, the control field of the MMAE may include a beamlink cluster bit indicating whether or not a common beamformed link is to be utilized for communication by two or more MAC entities having the two or more MAC addresses, e.g., as described in detail below.

In some demonstrative embodiments, wireless communication unit 104 may utilize the MMAE to establish a Multiple-MAC-Address-Link (MMAL) cluster with device 130. The MMAL cluster may include a plurality of links between the two or more MAC addresses included in the MMAE and one or more MAC addresses of device 130, e.g., as described in detail below.

For example, the MMAE may include the MAC addresses of MAC entities 140 and 144, and the MMAL cluster may include links between MAC entities 140 and 144 and one or more MAC entities of device 130.

In one example, device 130 may include a plurality of MAC entities. For example, the MMAL cluster may include links between MAC entities 140 and 144 and first, second, and third MAC entities of device 130. According to this example, the MMAL cluster may include six links, e.g., a link between MAC entity 140 and the first MAC entity of device 130, a link between MAC entity 140 and the second MAC entity of device 130, a link between MAC entity 140 and the third MAC entity of device 130, a link between MAC entity 144 and the first MAC entity of device 130, a link between MAC entity 144 and the second MAC entity of device 130, and a link between MAC entity 144 and the third MAC entity of device 130.

In another example, device 130 may include one MAC entity. For example, the MMAL cluster may include links between MAC entities 140 and 144 and the MAC entity of device 130. According to this example, the MMAL cluster may include two links, e.g., a link between MAC entity 140 and the MAC entity of device 130, and a link between MAC entity 144 and the MAC entity of device 130.

In some demonstrative embodiments, wireless communication unit 104 may transmit the MMAE as part of an association request frame to a PCP or an AP (PCP/AP), and the MMAE may include a Transmit Address (TA) field used for transmission of the association request frame, e.g., as described below.

In some demonstrative embodiments, wireless communication unit 104 may receive from the PCP/AP an association response frame including the MMAE, e.g., as described below.

In some demonstrative embodiments, the association response frame may include a Receive Address (RA) field equal to the TA field, e.g., as described below.

Figure 2:
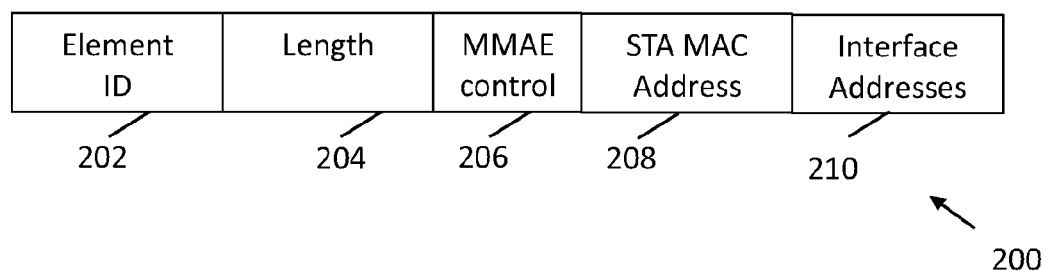
FIG. 2 is a schematic illustration of a Multi-MAC-Addresses-Element (MMAE) frame, in accordance with some demonstrative embodiments.

Reference is made to FIG. 2, which schematically illustrates a MMAE 200, in accordance with some demonstrative embodiments.

In some embodiments, MMAE 200 may be transmitted as part of a suitable frame between first and second wireless communication devices, e.g., DBand STAs, for example, wireless communication devices 102 and/or 130 (FIG. 1).

In some demonstrative embodiments, MMAE 200 may be transmitted by a MAC entity of one or more MAC entities of a wireless communication device. For example, MMAE 200 may be transmitted by a MAC entity of MAC entities 140, 142 and 144 (FIG. 1).

In some demonstrative embodiments, MMAE 200 may include an element identification (ID) field 202, a length field 204, a MMAE control field 206, a STA MAC field 208, and an interface address field 210, e.g., as described below.

In some demonstrative embodiments, element ID field 202 may have a predefined value indicating that MMAE 200 is related to multiple MAC addresses. For example, element ID field 202 may have a length of 1 octet.

In some demonstrative embodiments, length field 204 may include a value indicating a length of MMAE 200 or the length of one or more fields of MMAE 200, e.g., subsequent to length field 204. For example, length field 204 may have a length of 1 octet.

In some demonstrative embodiments, MMAE 200 may include one or more fields to identify one or more MAC addresses of one more MAC entities of the MAC entities of the wireless communication device. For example, fields 208 and/or 210 may include one or more MAC addresses of one or more of the MAC entities of the wireless communication device, e.g., as described below.

In some demonstrative embodiments, STA MAC field 208 may include a MAC address of the MAC entity, from which the MMAE is transmitted. For example, STA MAC field 208 may include the MAC address of MAC entity 140 (FIG. 1), e.g., if MMAE 200 is transmitted by MAC entity 140 (FIG. 1). For example, STA MAC field 208 may have a length of six octets.

In some demonstrative embodiments, field 210 may optionally be included as part of MMAE 200, for example, to identify one or more additional MAC addresses of one or more MAC entities other that the MAC entity, from which the MMAE is transmitted. For example, field 210 may include one or more MAC addresses of one or more of MAC entities 142 and 144 (FIG. 1), e.g., if MMAE 200 is transmitted by MAC entity 140 (FIG. 1). For example, field 210 may have a length of 6*n octets, wherein n is an integer variable denoting the number of the additional MAC addresses.

In some demonstrative embodiments, control field 206 may include one or more values defining at least one common communication attribute to be applied to the MAC addresses of fields 208 and 210, e.g., as described in detail below.

Figure 3:
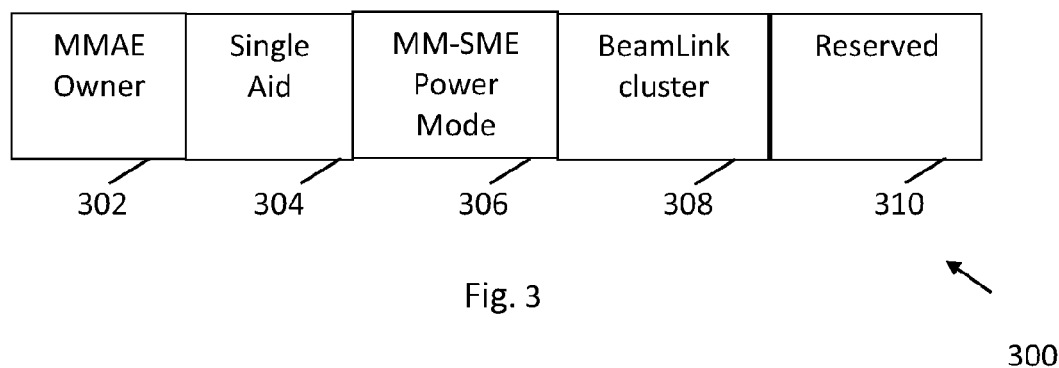
FIG. 3 is a schematic illustration of a MMAE control field, in accordance with some demonstrative embodiments.

Reference is made to FIG. 3, which schematically illustrates a MMAE control field 300, in accordance with some demonstrative embodiments.

In some embodiments, MMAE control field 300 may be transmitted as part of a MMAE, e.g., MMAE 200 (FIG. 2).

In some demonstrative embodiments, MMAE control field 300 may include a MMAE owner field 302, a single AID filed 304, a MM-SME power mode field 306, a beamlink cluster field 308, and a reserved field 310, as described in detail below.

In some demonstrative embodiments, MMAE owner field 302 may include a MMAE owner value identifying an owner MAC entity of the MMAE. For example, MMAE owner field 302 may include a first value representing no owner, a second value representing a non-Access-Point (AP) or non-Personal-Basic-Service-Set-Control-Point (PCP), a third value representing a PCP, or a fourth value representing an AP, e.g., as described in detail below.

In one example, MMAE owner field 302 may have include two bits, denoted B0 and B1, which may be encoded, for example, as follows:

TABLE 1

| MMAE owner | | Meaning |
|---|---|---|
| B0 | B1 | |
| 0 | 0 | No owner |
| 1 | 0 | Non-AP, Non-PCP MMAE |
| 0 | 1 | PCP MMAE |
| 1 | 1 | AP MMAE |

In some demonstrative embodiments, single AID field 304 may indicate whether a single AID is to be used for commonly identifying the MAC addresses identified by the MMAE, e.g., the MAC addresses of fields 208 and 210 (FIG. 2).

For example, single AID field 304 may have include one bit, denoted B3, which may be encoded, for example, as follows:

TABLE 2

| MMAE sent from | MMAE sent to | MMAE owner | | Single AID | Meaning |
|---|---|---|---|---|---|
| | | B0 | B1 | B3 | |
| Non-PCP, non-AP STA | PCP/AP | 1 | 0 | 1 | Request to allocate single AID for MAC addresses included in the MMAE |
| Non-PCP, non-AP STA | PCP/AP | 1 | 0 | 0 | Don't allocate single AID for MAC addresses included in the MMAE |
| PCP/AP STA | Non-PCP, non-AP STA | 1 | 0 | 1 | Single AID is allocated for all MAC addresses in the MMAE |
| PCP/AP STA | Non-PCP, non-AP STA | 1 | 0 | 0 | Single AID is not allocated for all MAC addresses in the MMAE |
| Non-PCP, non-AP STA | Non-PCP, non-AP STA | 1 | 0 | 1 | Single AID is allocated for all MAC addresses in the MMAE |
| Non-PCP, non-AP STA | Non-PCP, non-AP STA | 1 | 0 | 0 | Single AID is not allocated for all MAC addresses in the MMAE |
| PCP/AP STA | Non-PCP, non-AP STA | 0 | 1 | 1 | Single AID is allocated for all MAC addresses in the non-PCP, non-AP STA MMAE |
| PCP/AP STA | Non-PCP, non-AP STA | 0 | 1 | 0 | Single AID is not allocated for all MAC addresses in the non-PCP, non-AP STA MMAE |

As shown in Table 2, for example, the values of fields 302 and 304 may be determined, for example, based on whether or not the MAC entity transmitting the MMAE is an AP/PCP MAC entity and/or based on whether or not as single AID is to be allocated to all MAC addresses identified by the MMAE. For example, per the two last rows of Table 2, a PCP/AP MAC entity may send a response to a request frame including an MMAE from a non-PCP/AP MAC entity to acknowledge the allocation of a single AID to all MAC addresses in the MMAE from the non-PCP/AP MAC entity.

In some demonstrative embodiments, field 306 may include a power-mode bit indicating a common power state scheme to be applied to two or more MAC entities having two or more MAC addresses identified by the MMAE, e.g., the MAC addresses of fields 208 and 210 (FIG. 2).

For example, the power-mode bit may have either a first value, e.g., "1" or a second value, e.g., "0". The first value, e.g., "1", may indicate that when a MAC entity, e.g., MAC entity 140 (FIG. 1), advertised in the MMAE, e.g., MMAE 200 (FIG. 2), sent by the MAC entity, e.g., MAC entity 140 (FIG. 1), coordinated by an MM-SME, e.g., MM-SME 146 (FIG. 1), moves from an awake to a doze state, then all other MAC entities, e.g., MAC entities 142 and/or 144 (FIG. 1), advertised in the MMAE sent by the MAC entity coordinated by the MM-SME, e.g., if the MMAE includes the MAC addresses of MAC entities 142 and/or 144 (FIG. 1), move to the doze state. The first value, e.g., "1", may indicate that the MAC entity, e.g., MAC entity 140 (FIG. 1), coordinated by the MM-SME, e.g., MM-SME 146 (FIG. 1), moves to the Awake state only when MAC entities advertised in the MMAE, e.g., MAC entities 142 and/or 144 (FIG. 1), move to the awake state. The first value, e.g., "0", may indicate that when a MAC entity, e.g., MAC entity 140 (FIG. 1), advertised in the MMAE, e.g., MMAE 200 (FIG. 2), sent by the MAC entity, e.g., MAC entity 140 (FIG. 1), moves from the doze to the awake state, then all other MAC entities, e.g., MAC entities 142 and/or 144 (FIG. 1), advertised in the MMAE sent by the MAC entity coordinated by the MM-SME, e.g., if the MMAE includes the MAC addresses of MAC entities 142 and/or 144 (FIG. 1), move to the awake state. The second value, e.g., "1", may indicate that the MAC entity, e.g., MAC entity 140 (FIG. 1), coordinated by the MM-SME, e.g., MM-SME 146 (FIG. 1), moves to the doze state only when all MAC entities advertised in the MMAE move to the Doze state.

In some demonstrative embodiments, field 308 may include a beamlink cluster bit indicating whether or not a common beamformed link is to be utilized for communication by two or more MAC entities having two or more MAC addresses identified by the MMAE, e.g., the MAC addresses of fields 208 and 210 (FIG. 2).

For example, field 308 may include a single bit set to a first value, e.g., "1", for example, if the MAC entity transmitting the MMAE intends to maintain the same beamformed link for all links within a MMAL cluster. Otherwise, for example, field 308 may be set to a second value, e.g., "0".

Referring back to FIG. 1, in some demonstrative embodiments, PHY sub-layer 152 may indicate a current transmission state of the PHY layer, for example, using an indication signal, e.g., denoted, PHY-TxBusy.indication. The signal PHY-TxBusy.indication may include a state parameter having one of two values BUSY or IDLE. The parameter value is BUSY, for example, if the PHY layer is busy transmitting, e.g., a PLCP Protocol Data Unit (PPDU), thus not available to respond, e.g., with a PHY-TXSTART.confirm indication to a PHY-TXSTART.request. Otherwise, the value of the parameter may be IDLE.

The signal PHY-TxBusy.indication may be generated, for example, when the PHY layer issues a PHY-TXSTART.confirm signal to one of the MAC entities coordinated by MM-SME 146. The signal PHY-TxBusy.indication may be provided, for example, to all coordinated MAC entities except, e.g., to a MAC entity that to which the PHY layer responds with the PHY-TXSTART.confirm. The STATE of the signal PHY-TxBusy.indication may be set to BUSY.

The signal PHY-TxBusy.indication may be generated, for example, within a predefined delay period, TxPLCPDelay, of the occurrence of a change in the state of a PLCP transmit state machine to a receive (RX) state. The STATE of the signal PHY-TxBusy.indication may be set to IDLE.

In some demonstrative embodiments, wireless communication unit 104 may utilize the MMAE, e.g., MMAE 200 (FIG. 2), to establish a MMAL cluster with device 130. The MMAL cluster may include a plurality of links between the two or more MAC addresses included in the MMAE and one or more MAC addresses of device 130, e.g., as described in detail below.

In some demonstrative embodiments, a MAC entity, e.g., MAC entity 140, 142 and/or 144, of system 100 may be capable of participating in a MMAL cluster if it includes a MMAE, e.g., MMAE 200 (FIG. 2), in a most recent transmission of, for example, an Association Request, a (Re-) Association Response, a ADDTS Request, a ADDTS Response, a Probe Request, a Probe Response, an Information Request or Information Response frame, and the like. 20

In some demonstrative embodiments, a MM-SME coordinated MAC entity, e.g., MAC entities 140, 142, and/or 144, may be MMAL cluster capable and a non-MM-SME coordinated MAC entity, e.g., a MAC entity which is not coordinated by a MM-SME, may be MMAL cluster capable. A MMAL cluster capable MAC entity may include an MMAE, e.g., MMAE 200 (FIG. 2) in a transmitted Association Request frame, Re-association request frame, association response frame, and/or Re-Association Response frame.

In some demonstrative embodiments, all MAC entities coordinated by an MM-SME and indicated within an MMAE may be equivalent, e.g., such that each MAC entity may be used for MMAL Cluster setup and/or maintenance.

In some demonstrative embodiments, a PCP STA, e.g., a MAC entity of MAC entities 140, 142 and 144, which may perform the functionality of a PCP STA, may transmit a MMAE including a MAC address that is equal to a Basic-Service-Set-ID (BSSID) of the PCP and one or more other MAC addresses, which are not equal to the BSSID. The PCP STA may not use the other MAC addresses, which are not equal to the BSSID, to request and/or respond to association, re-association, probing and/or scheduling services provided by the PCP STA.

In some demonstrative embodiments, a non-PCP/non-AP STA, e.g., a MAC entity of MAC entities 140, 142 and 144, which may perform the functionality of a non-PCP/non-AP STA, may transmit a MMAE, e.g., MMAE 200 (FIG. 2) to a PCP/AP. The non-PCP/non-AP STA may not be allowed to send an ADDTS Request frame to the PCP/AP with a Transmit Address (TA) field equal to a MAC address, which was not included in the delivered MMAE.

In some demonstrative embodiments, an MA-SME coordinated MAC entity, e.g., a MAC entity of MAC entities 140, 142 and 144, may be associated with a PCP/AP that allocates one single AID to all STAs advertised in an MMAE sent by the MM-SME coordinated MAC entity. The AID may be used to identify an MMAL Cluster. For example, the AID may be provided for one of the advertised MAC entities of the MA-ME coordinated MAC entity. Accordingly, the same AID may apply to all MAC entities identified by the MAC addresses in a MMAE having a Single AID field, e.g., field 304 (FIG. 3), set to "1".

In some demonstrative embodiments, a MMAL cluster between a first MM-SME coordinated station ("station A"), e.g., MAC entities 140, 142 and/or 144, and a second MM-SME coordinated station ("station B"), e.g., one or more MAC entities of device 130, may be identified using a single common AID. For example, it may be determined whether or not the MMAL cluster is to be identified using the AID, based on the single AID field, e.g., field 304 (FIG. 3), of MMAEs exchanged between the STAs.

For example, the MMAL cluster identification may be determined, as follows:

TABLE 3

| MMAL cluster configuration | Is the Single AID allocated to the MM-SME coordinated STA A? | Is the Single AID allocated to the MM-SME coordinated STA B? | AID identification of MMAL cluster |
|---|---|---|---|
| Non-PCP/non-AP MM-SME coordinated STA A is associated to PCP MM-SME coordinated STA B | Yes | Yes | Yes |
| Non-PCP/non-AP MM-SME coordinated STA A and Non-PCP/non-AP MM-SME coordinated STA B are both associated to the same BSS | Yes | Yes | Yes |
| Non-PCP/non-AP MM-SME coordinated STA A is associated to a BSS and Non-PCP/non-AP MM-SME coordinated STA B is not associated to the BSS | Yes | No | No |

TABLE 3-continued

| MMAL cluster configuration | Is the Single AID allocated to the MM-SME coordinated STA A? | Is the Single AID allocated to the MM-SME coordinated STA B? | AID identification of MMAL cluster |
|---|---|---|---|
| Non-PCP/non-AP MM-SME coordinated STA A and Non-PCP/non-AP STA B are both associated to the same BSS | Yes | N/A | Yes |
| Non-PCP/non-AP MM-SME coordinated STA A is associated to a BS and one STA of non-PCP/non-AP MM-SME coordinated STA B is associated to the same BSS | Yes | N/A | Yes |

In some demonstrative embodiments, a MMAL cluster may be established by a MM-SME coordinated MAC entity, e.g., MAC entities 140, 142 and/or 144, transmitting to a peer MAC entity a MMAE including a plurality of advertised MAC entities, e.g., as described above with reference to FIGS. 2 and/or 3. The peer MAC entity may be an MM-SME coordinated MAC entity or a non-MM-SME coordinated MAC entity.

In some demonstrative embodiments, the MMAL cluster may identified, for example, by advertised MAC addresses of MAC entities of two MM-SME coordinated MAC entities; or advertised MAC addresses of the MAC entities of an MM-SME coordinated MAC entity and of a non-MM-SME coordinated MAC entity.

In some demonstrative embodiments, an MMAL cluster agreement may be set up by exchanging an MMAE between the MAC entities, e.g., as described below.

In some demonstrative embodiments, if a MMAL cluster capable non-MM-SME coordinated MAC entity receives an ADDTS Request frame, which includes an MMAE, the SME of the non-MM-SME coordinated MAC entity may include the received MMAE in a MLME-ADDTS.response primitive used to send an ADDTS Response frame, e.g., if the SME accepts the MMAL cluster setup. The SME of the non-MM-SME coordinated MAC entity may set an MMAE owner field to "no Owner||" in the MMAE included in an MLME-ASSOCIATE.request primitive and/or a MLME-ADDTS.request primitive, e.g., to establish the MMAL cluster with an MM-SME coordinated STA.

In some demonstrative embodiments, the MAC entities of the MMAL cluster may exchange the MMAE, for example, once per MMAL cluster setup.

In some demonstrative embodiments, an MMAL cluster may be setup between a non-PCP/non-AP MM-SME coordinated MAC entity and PCP/AP.

For example, association request and response frames may be used to establish the MMAL cluster between a non-PCP/non-AP MM-SME coordinated STA and a PCP/AP. The MMAE control field within the MMAE included in the association request and response frames may be asserted, e.g., as described above with reference to FIG. 2. The PCP/AP may include the MMAE received from the non-PCP/non-AP MM-SME coordinated STA in the association response frame sent as response, e.g., if the PCP/AP is not an MM-SME coordinated STA. The PCP/AP may include its own MMAE, which may include the PCP/AP advertised MAC entities in the association response frame, e.g., if the PCP/AP is an MM-SME coordinated STA. The PCP/AP may not respond with any MMAE, for example, if the PAP/AP is not MMAL cluster capable. The setup of the MMAL Cluster may fail, for example, if the association response frame does not contain the MMAE.

In some demonstrative embodiments, an MMAL cluster may be setup between a non-PCP/non-AP STA with another non-PCP/non-AP STA.

According to these embodiments, if, for example, a non-PCP/non-AP MM-SME coordinated STA associated with a PCP/AP has established an AID identified MMAL cluster with the PCP/AP, then the non-PCP/non-AP MM-SME coordinated STA may not use a MAC address that was not included in the MMAE delivered to the PCP/AP to establish a MMAL cluster with another non-PCP/non-AP MM-SME coordinated STA associated with the same PCP/AP.

In some demonstrative embodiments, a MMAL cluster between non-PCP/non-AP MM-SME coordinated STAs and/or a MMAL cluster between a non-PCP/non-AP MM-SME coordinated STA and a non-PCP/non-AP non-MM-SME coordinated STA, may be set up by exchanging ADDTS Request/Response frames with a PTP TSPEC.

In some demonstrative embodiments, a non-PCP/non-AP MM-SME coordinated STA may include an MMAE, which includes, its advertised MAC entities in transmitted ADDTS Request frames. The transmitted MMAE may include an asserted MMAE control field, e.g., as described above with reference to FIGS. 2 and/or 3.

In some demonstrative embodiments, a non-PCP/non-AP STA, which is not an MM-SME coordinated STA, may transmit an ADDTS request frame with a MMAE including an owner field, e.g., field 302 (FIG. 3), set to the value representing "no owner".

In some demonstrative embodiments, a non-PCP/non-AP MM-SME coordinated STA may transmit ADDTS response frames including an MMAE of the non-PCP/non-AP MM-SME coordinated STA, which includes the advertised MAC entities of the non-PCP/non-AP MM-SME coordinated STA. The transmitted MMAE may include an asserted MMAE control field, e.g., as described above with reference to FIGS. 2 and/or 3.

In some demonstrative embodiments, the power management mode of MAC entities 140, 142 and/or 144 may be commonly managed and/or controlled, e.g., using MMAE 200 (FIG. 2).

In some demonstrative embodiments, a STA that is coordinated by an MM-SME may inform an AP of a change in Power Management mode, for example, through a successful frame exchange initiated by the STA. For example, MAC entities 140, 142 and/or 144 may transmit a MMAE, e.g., MMAE 200 (FIG. 2) including a MM-SME Power Mode field, e.g., field 306 (FIG. 1), set to indicate the Power Management mode that the MAC entities coordinated by the MM-SME and advertised in the MMAE may adopt upon successful completion of the frame exchange. The frame may be sent, for example, using any of the MMAL within a MMAL cluster established with the AP, e.g., in order to change the Power Management mode of the coordinated MAC entity.

For example, if an MA-SME coordinated MAC entity, e.g., MAC entity 140, 142 and/or 144, transmits a MMAE, e.g., MMAE 200 (FIG. 2) including a MM-SME Power Mode field, e.g., field 306 (FIG. 1), set to "1", then all MAC entities, which are advertised in the MMAE, may switch to the Doze state when the wakeup schedule of any one MAC entity or a successful frame exchange brings the MAC entity to the Doze state. If, for example, the MA-SME Power Mode field is set to "zero", then, for example, all MAC entities, which are advertised in the MMAE, may switch to the Awake state when the wakeup schedule of any one MAC entity or a successful frame exchange brings the MAC entity to the Awake state.

In some demonstrative embodiments, the association, re-association and/or disassociation, of MAC entities 140, 142 and/or 144 may be managed and/or controlled, e.g., using MMAE 200 (FIG. 2).

In some demonstrative embodiments, one or more MAC entities of system 100, e.g., MAC entities 140, 142 and/or 144, and/or one or more MAC entities of device 130 may utilize a state variable expressing a relative state between a local MAC entity and a remote MAC entity. For example, the state variable may have a first value "State 1" representing an initial start state for OBand, e.g., Unauthenticated, unassociated. The state variable may have a second value "State 2" representing an initial start state for DBand, e.g., Authenticated (OBand only), not associated. The state variable may have a third value "State 3" representing, e.g., an Authenticated (OBand only) and associated (Pending RSN Authentication) state. The state variable may have a fourth value "State 4" representing, e.g., an RSNA Established or Not Required (Infrastructure BSS and PBSS only) Authenticated and associated state.

In some demonstrative embodiments, if an MM-SME coordinated MAC entity receives an Association Response frame with a result code equal to SUCCESS and including a MMAE, e.g., MMAE 200 (FIG. 2), which includes a Single AID field, e.g., field 304 (FIG. 3) set to "1", then the state may be set to "state 3", e.g., for each of the MAC entities advertised within the MMAE, for example, for which a dot11RSNAEnabled indication is true. Progress from "State 3" to "State 4" may occur, for example, independently in each of the MAC entities. The state may be set to "state 4", e.g., for each of the MAC entities advertised within the MMAE, for example, for which the dot11RSNAEnabled indication is false.

In some demonstrative embodiments, the MM-SME may repeat the association procedure for any other MAC entity coordinated by of the MA-SM, if, for example, the MA-SME coordinated STA in State 3 is assigned an AID for only a MAC entity identified by an RA field of the Association Response with result code equal to SUCCESS.

In some demonstrative embodiments, an MM-SME, e.g., MM-SME 146, of a non-PCP/non-AP STA may include a MMAE, e.g., MMAE 200 (FIG. 2) in an MLME-ASSOCIATE.request primitive. The MM-SME may include in the MMAE the MAC address associated with the MLME SAP instance to which the primitive is submitted.

In some demonstrative embodiments, if a MM-SME coordinated MAC entity receives from a PCP/AP an Association Response frame with a status code of Successful containing an MLME element with the Single AID field set to "1", then all the MAC entities coordinated by of the MM-SME may be associated with the PCP/AP, e.g., by setting to State 4, or State 3, e.g., if RSNA Establishment is required.

In some demonstrative embodiments, upon receipt of an Association Request frame from a non-PCP/non-AP STA for which the state is "State 2", "State 3", or "State 4", a PCP/AP's MLME may associate with the non-PCP/non-AP STA.

In some demonstrative embodiments, the PCP/AP may receive from a MLME of a non-PCP/non-AP MAC entity a MLME-ASSOCIATE.indication primitive including an MMAE parameter, e.g., as part of an association request frame. The PCP/AP may generate a MLME-ASSOCIATE.response primitive directed to the MLME of the MAC entity, which may be identified by a Peer STA Address parameter of the MLME-ASSOCIATE.indication primitive. The PCP/AP may allocate a single AID for all the MAC entities included in the MMAE, if, for example, the Single AID field in the MMAE parameter of the MLME-ASSOCIATE.indication primitive is set to "1". The PCP/AP may include the MMAE received from the MM-SME coordinated MAC entity in the MLME-ASSOCIATION.response primitive, for example, if the PCP/AP allocates the same AID to all MAC entities. The PCP/AP may not allocate a single AID for all MAC entities, for example, if the Single AID field of the MMAE is set to "0".

In some demonstrative embodiments, a MM-SME of a non-PCP/non-AP STA may include a MMAE in an MLME-REASSOCIATE.request primitive. The MM-SME may include in the MMAE the MAC address associated with the MLME SAP instance to which the primitive is submitted. Upon receipt of the MLME-REASSOCIATE.request primitive, a non-PCP/non-AP MAC entity may reassociate with a PCP/AP. If a MM-SME coordinated MAC entity receives a Reassociation Response frame with a status code of Successful containing an MLME element with the Single AID field et to "1", all the MAC entities coordinated by the MM-SME may be reassociated with the PCP/AP, e.g., by setting to "State 4" or "State 3", e.g., if RSNA Establishment is required.

In some demonstrative embodiments, MM-SME 146 may commonly perform one or more disassociation operations with respect to MAC entities, for which association was commonly established, e.g., using the Single AID field. The disassociaiton operations may include, for example, setting a state of the MAC entities, deleting keys, and the like. For example, a non-PCP/non-AP MAC entity's MLME may disassociate from a PCP/AP, e.g., upon receipt of an MLME-DISASSOCIATE.request primitive. If the state for the PCP/AP is State 3 or State 4, the MLME may transmit a Disassociation frame to the PCP/AP. The state for the PCP/AP may be set to State 2, e.g., if it was not State 1. In the case of an MM-SME coordinated MAC entity, the MLME may set the state of the PCP/AP for all MAC entities whose address was included in the MMAE parameter of the MLME-ASSOCIATE.request or MLME-REASSOCIATE.request primitive that established the association. The MLME may issue an MLME-DISASSOCIATE.confirm primitive to inform the SME of the successful completion of the disassociation. Upon receiving a MLME-DISASSOCIATE.confirm primitive, the SME may delete any Pairwise Transient Key Security Association (PTKSA) and/or temporal keys held for communication with the PCP/AP. In the case of an MM-SME coordinated MAC entity, the MLME may perform this operation for all MAC entities whose address was included in the MMAE parameter of the MLME-ASSOCIATE.request or MLME-REASSOCIATE.request primitive that established the association.

In some demonstrative embodiments, a beamforming link established between STAs may be used by all MAC sub-layers 153, 154 and 155 coordinated by the same MM-SME 146.

In some demonstrative embodiments, if an MMAL cluster capable MAC entity has successfully transmitted to a peer STA a MMAE, e.g., MMAE 200 (FIG. 1), with a BeamLink Cluster field, e.g., field 308 (FIG. 1) set to "1", then all MAC entities of the STA may use a single, e.g., common, beam-formed link for the MMAL cluster. The MAC address used by the STA to initiate the beamforming procedure may remain the same, for example, until the completion of the beamforming procedure.

In some demonstrative embodiments, a non-MM-SME coordinated MAC entity may receive an ADDTS request frame from MM-SME coordinated MAC entity including an MMAE from the MM-SME coordinated MAC entity. The non-MM-SME coordinated MAC entity may include the MMAE of the MM-SME coordinated MAC entity in an ADDTS Response sent as response. The non-MM-SME coordinated MAC entity may not respond with any MMAE, e.g., if the non-MM-SME coordinated MAC entity is not MMAL cluster capable. The setup of the MMAL Cluster may fail, for example, if the ADDTS response frame does not contain the MMAE.

In some demonstrative embodiments, a Service Period (SP) may be utilized by MAC entities of a MMAL cluster. For example, a MAC entity coordinated by an MM-SME that belongs to an MMAL cluster identified by the Source AID and Destination AID that are equal to, respectively, the Source AID and Destination AID of the Allocation field in the Extended Scheduled element that allocates the SP, may transmit during the SP, if the MAC entity sent a MMAE to the peer MAC entity and the BeamLink Cluster field within the MMAE is set to "1". A MAC entity coordinated by an MM-SME of an MMAL cluster identified by the Source AID and Destination AID that are equal to, respectively, the Source AID and Destination AID of the Dynamic Allocation Info field in a Grant frame may transmit during the allocation, if the STA sent a MMAE to the peer MAC entity and the BeamLink cluster field within the MMAE is set to "1".

Figure 4:
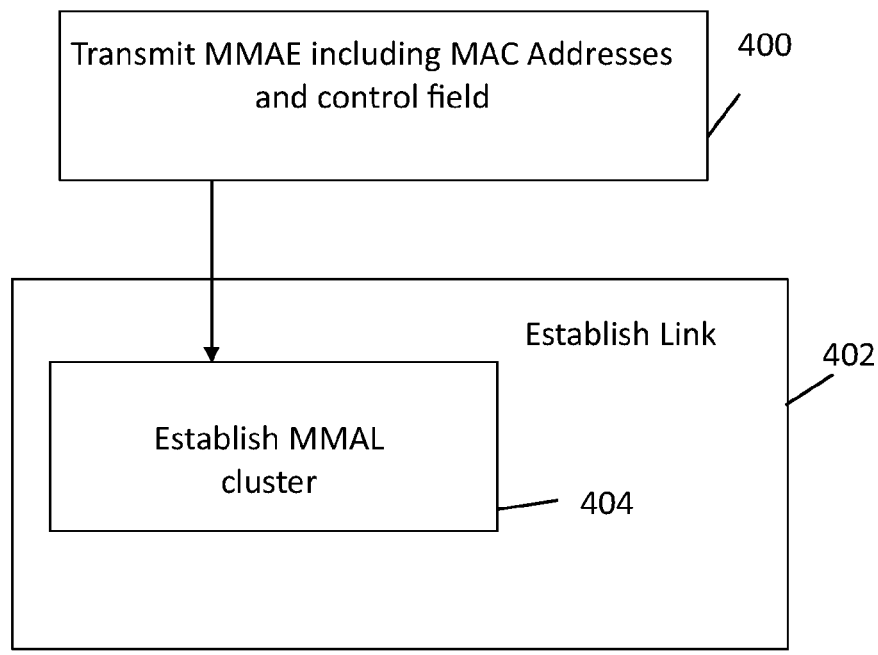
FIG. 4 is a schematic illustration of a method of wireless communication, in accordance with some demonstrative embodiments.

Reference is made to FIG. 4, which schematically illustrates a method of wireless communication, in accordance with some demonstrative embodiments. In some embodiments, one or more of the operations of the method of FIG. 4 may be performed by any suitable wireless communication system e.g., system 100 (FIG. 1); wireless communication device, e.g., devices 102 and/or 130 (FIG. 1); and/or wireless communication unit, e.g., wireless communication units 104 and/or 132 (FIG. 1).

As indicated at block 400, the method may include transmitting a wireless communication frame including MMAE corresponding to a plurality of MAC sub-layers, which share a common physical layer, having a respective plurality of MAC addresses. The MMAE may include two or more MAC addresses of the plurality of MAC addresses and a control field defining at least one common communication attribute to be applied to the two or more MAC addresses. For example, wireless communication unit 104 (FIG. 1) may transmit MMAE 200 (FIG. 2), e.g., as described above.

As indicated at block 402, the method may include establishing a link between the wireless communication unit and a wireless communication device using the MMAE. For example, wireless communication unit 104 (FIG. 1) may use MMAE 200 (FIG. 2) for associating with device 130 (FIG. 1) and/or establishing at least one wireless communication link with device 130 (FIG. 1), e.g., as described above.

As indicated at block 404, the method may include establishing a MMAL cluster using the MMAE. For example, wireless communication unit 104 (FIG. 1) may establish a MMAL cluster between one or more MAC entities of device 102 (FIG. 1) and one or more MAC entities of device 130 (FIG. 1), e.g., as described above.

Figure 5:
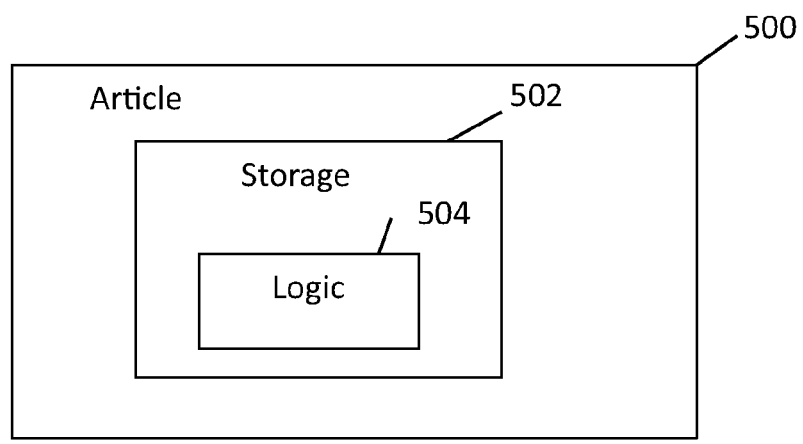
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); and/or to perform one or more operations of the method of FIG. 4.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising a memory and a processor, the processor configured to cause a wireless communication device to:
generate a Multiple Media Access Control (MAC) element comprising a plurality of MAC addresses to be coordinated by a Multiple MAC Station Management Entity (MM-SME), the Multiple MAC element comprising a control field, the control field comprising an element owner field, a Single Association-Identifier (AID) field, a power mode field, and a beamlink cluster field, the Single AID field to indicate whether or not a single AID is to be allocated to the plurality of MAC addresses, the processor configured to cause the wireless communication device to encode the element owner field to a first value representing no owner, a second value representing a non-Access-Point (AP) or non-Personal-Basic-Service-Set-Control-Point (PCP), a third value representing a PCP, or a fourth value representing an AP, the processor configured to cause the wireless communication device to set the power mode field to a predefined value to indicate that, when a station (STA) advertised in the Multiple MAC element moves from a first power state to a second power state, all other STAs advertised by said Multiple MAC element move to said second power state, and to indicate that said STA moves from said second power state to said first power state only when said all other STAs move to said first power state; and
cause transmission of a frame comprising the Multiple MAC element.

2. The apparatus of claim 1, wherein the element owner field comprises only two bits comprising a first bit and a second bit of the control field, and the Single AID field comprises a single bit comprising a third bit of the control field.

3. The apparatus of claim 2, wherein the processor is configured to, when the Multiple MAC element is to be sent from a non-PCP/non-AP STA to a PCP/AP STA, encode the first bit to "1", encode the second bit to "0", and encode the third bit to "1" to request to allocate the single AID for the plurality of MAC addresses, or to "0" to indicate that the single AID is not to be allocated for the plurality of MAC addresses.

4. The apparatus of claim 2, wherein the processor is configured to, when the Multiple MAC element is to be sent from a PCP/AP STA to a non-PCP/non-AP STA, encode the first bit to "1", encode the second bit to "0", and encode the third bit to "1" to indicate that the single AID is allocated for the plurality of MAC addresses, or to "0" to indicate that the single AID is not allocated for the plurality of MAC addresses.

5. The apparatus of claim 2, wherein the processor is configured to, when the Multiple MAC element is to be sent from a first non-PCP/non-AP STA to a second non-PCP/non-AP STA, encode the first bit to "1", encode the second bit to "0", and encode the third bit to "1" to indicate that the single AID is allocated for the plurality of MAC addresses, or to "0" to indicate that the single AID is not allocated for the plurality of MAC addresses.

6. The apparatus of claim 2, wherein the processor is configured to cause the wireless communication device to send a first Multiple MAC element from a PCP/AP STA to a non-PCP/non-AP STA based on a second Multiple MAC element from the non-PCP/non-AP STA, the processor to encode the first bit to "0", to encode the second bit to "1", and to encode the third bit to "1" to indicate that the single AID is allocated for a plurality of MAC addresses in the second Multiple MAC element from the non-PCP/non-AP STA, or to "0" to indicate that the single AID is not allocated for the plurality of MAC addresses in the second Multiple MAC element from the non-PCP/non-AP STA.

7. The apparatus of claim 1, wherein the processor is configured to set the power mode field to the predefined value to indicate that, when the STA advertised in the Multiple MAC element moves from an awake state to a doze state, all other STAs advertised by said Multiple MAC element move to said doze state, and to indicate that said STA moves from said doze state to said awake state only when said all other STAs move to said awake state.

8. The apparatus of claim 7, wherein said predefined value is "1".

9. The apparatus of claim 1, wherein the processor is configured to set the power mode field to the predefined value to indicate that, when the STA advertised in the Multiple MAC element moves from a doze state to an awake state, all other STAs advertised by said Multiple MAC element move to said awake state, and to indicate that said STA moves to said doze state only when said all other STAs move to said doze state.

10. The apparatus of claim 9, wherein said predefined value is "0".

11. The apparatus of claim 1, wherein said power mode field comprises one bit.

12. The apparatus of claim 1, wherein the processor is configured to set the beamlink cluster field to a predefined value to indicate that a same beamformed link is to be maintained for all links within a Multiple MAC link cluster.

13. The apparatus of claim 1, wherein the Multiple MAC element comprises a STA MAC address field comprising a STA MAC address.

14. The apparatus of claim 1, wherein the processor is configured to cause the wireless communication device to establish a Multiple MAC link cluster comprising Multiple MAC links between a STA coordinated by the MM-SME and another STA.

15. The apparatus of claim 1, wherein said frame comprises a management action frame.

16. The apparatus of claim 1, wherein said frame comprises a probe request frame, an association request frame, an information request frame, an announce frame, an information response frame, an Add Traffic Stream (ADDTS) request frame, an ADDTS response frame, a re-association request frame, or a re-association response frame.

17. The apparatus of claim 1, wherein the plurality of MAC addresses identify a plurality of MAC sublayers sharing a common Physical Layer (PHY).

18. The apparatus of claim 1 comprising the MM-SME configured to control at least a power management mode and an antenna configuration of a plurality of coordinated STAs corresponding to the plurality of MAC addresses.

19. The apparatus of claim 1 comprising the MM-SME configured to coordinate management of a plurality of MAC sublayers, a MAC sublayer having a separate MAC Service Access Point (SAP) and a separate MAC sub-Layer Management Entity (MLME) SAP.

20. The apparatus of claim 1 comprising a radio.

21. The apparatus of claim 1 comprising one or more antennas.

22. A product comprising one or more tangible computer-readable non-transitory storage media comprising computer-executable instructions operable to, when executed by at least one processor, enable the at least one processor to cause a wireless communication device comprising a Multiple MAC Station Management Entity (MM-SME) to:

generate a Multiple Media Access Control (MAC) element comprising a plurality of MAC addresses to be coordinated by said MM-SME, the Multiple MAC element comprising a control field, the control field comprising an element owner field, a Single Association-Identifier (AID) field, a power mode field, and a beamlink cluster field, the Single AID field to indicate whether or not a single AID is to be allocated to the plurality of MAC addresses, the instructions, when executed, cause the wireless communication device to encode the element owner field to a first value representing no owner, a second value representing a non-Access-Point (AP) or non-Personal-Basic-Service-Set-Control-Point (PCP), a third value representing a PCP, or a fourth value representing an AP, the instructions, when executed, cause the wireless communication device to set the power mode field to a predefined value to indicate that, when a station (STA) advertised in the Multiple MAC element moves from a first power state to a second power state, all other STAs advertised by said Multiple MAC element move to said second power state, and to indicate that said STA moves from said second power state to said first power state only when said all other STAs move to said first power state; and transmit a frame comprising the Multiple MAC element.

23. The product of claim 22, wherein the element owner field comprises only two bits comprising a first bit and a second bit of the control field, and the Single AID field comprises a single bit comprising a third bit of the control field.

24. The product of claim 22, wherein the instructions, when executed, cause the wireless communication device to set the power mode field to the predefined value to indicate that, when the STA advertised in the Multiple MAC element moves from an awake state to a doze state, all other STAs advertised by said Multiple MAC element move to said doze state, and to indicate that said STA moves from said doze state to said awake state only when said all other STAs move to said awake state.

25. The product of claim 22, wherein the instructions, when executed, cause the wireless communication device to set the power mode field to the predefined value to indicate that, when the STA advertised in the Multiple MAC element moves from a doze state to an awake state, all other STAs advertised by said Multiple MAC element move to said awake state, and to indicate that said STA moves to said doze state only when said all other STAs move to said doze state.

26. The product of claim 22, wherein the instructions, when executed, cause the wireless communication device to set the beamlink cluster field to a predefined value to indicate that a same beamformed link is to be maintained for all links within a Multiple MAC link cluster.

27. The product of claim 22, wherein the instructions, when executed, cause the wireless communication device to establish a Multiple MAC link cluster comprising Multiple MAC links between a STA coordinated by the MM-SME and another STA.

28. The product of claim 22, wherein said frame comprises a probe request frame, an association request frame, an information request frame, an announce frame, an information response frame, an Add Traffic Stream (ADDTS) request frame, an ADDTS response frame, a re-association request frame, or a re-association response frame.

* * * * *